United States Patent
Hager

[15] 3,700,113
[45] Oct. 24, 1972

[54] TIRE STORAGE RACK

[72] Inventor: Clarence H. Hager, Rockford, Ill.

[73] Assignee: Modern Caster Co., Inc., Rockford, Ill.

[22] Filed: Feb. 4, 1971

[21] Appl. No.: 112,577

[52] U.S. Cl. .................................................. 211/23
[51] Int. Cl. .................................................. A47f 7/04
[58] Field of Search ............................... 211/23, 24

[56] References Cited

UNITED STATES PATENTS 3,393,807   7/1968   Sylvester ...................... 211/24
2,306,540   12/1942  Bales ............................ 211/23

Primary Examiner—Nile C. Byers, Jr.
Attorney—McCanna, Morsbach, Pillote & Muir

[57] ABSTRACT

A plurality of upright supports are removably mounted on a mobile bed by means of wedges secured to the upright supports for engaging the sides of an elongate opening in a plate at the top of the bed. A second plate, spaced below the first plate, is shaped to closely receive the lower end of the upright support to complete the removable mounting arrangement. The upright support is tubular and has an internal strut extending in the lateral direction. A plurality of elongated arms are welded on each support member to support a tire. Each arm is formed into a tube from a continuous sheet of material and shaped with an arcuate upper portion and a generally flat bottom. The edges of the original sheet are located at the bottom of the tube and means is provided to hold the edges in a closed position.

12 Claims, 8 Drawing Figures

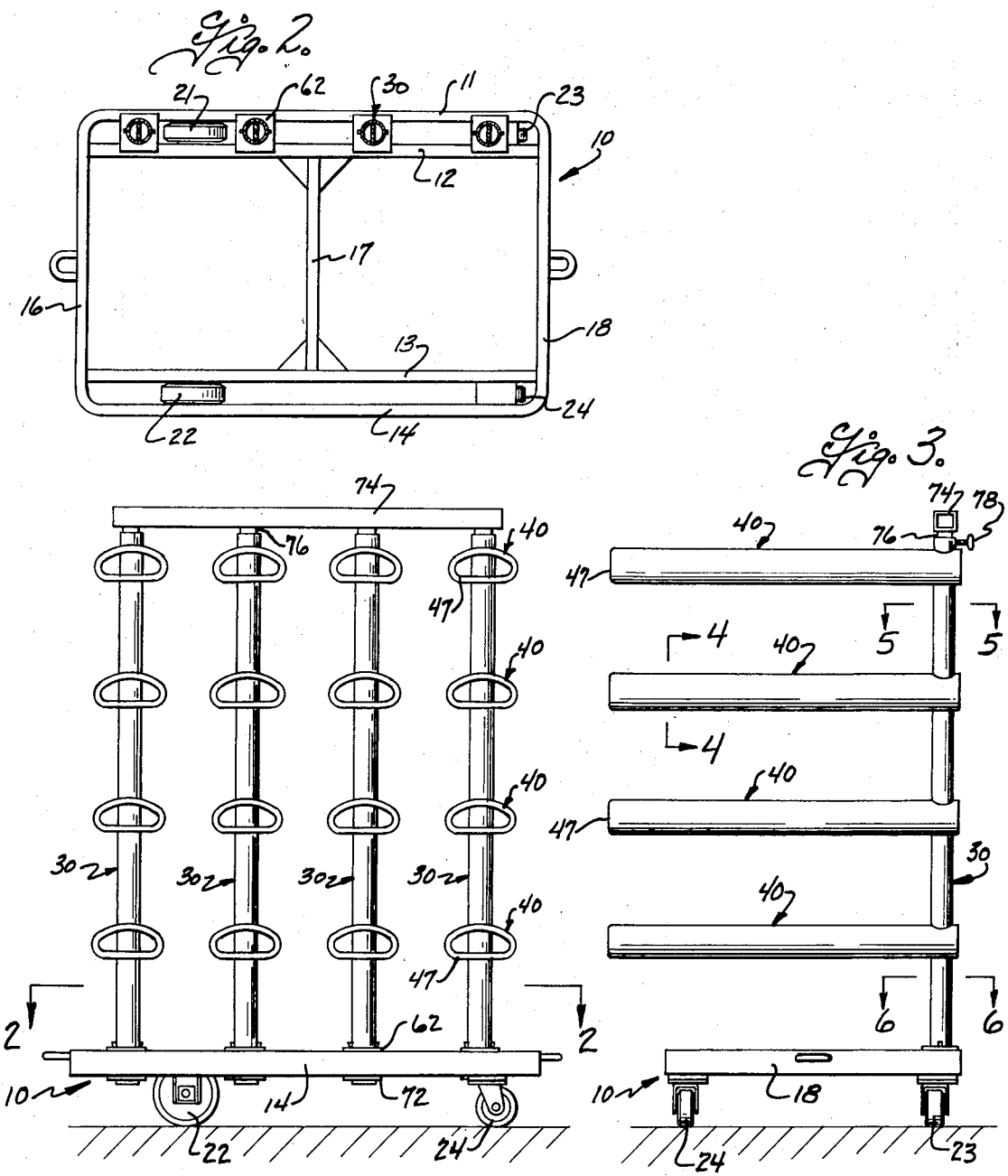

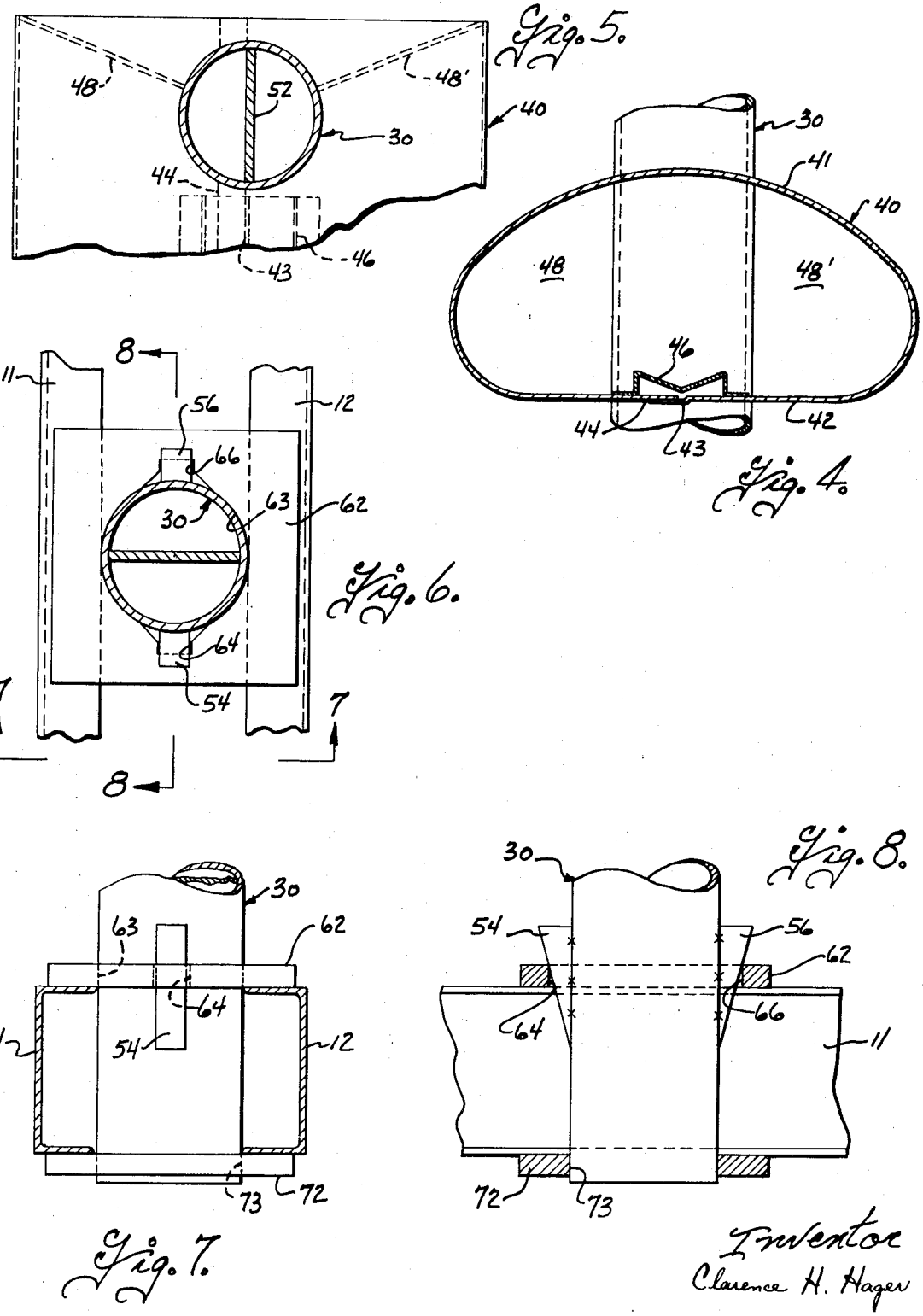

TIRE STORAGE RACK

BACKGROUND

The present invention pertains generally to supports and racks and more particularly to a support or rack of the special article type which may be used for supporting or storing green tires.

In the manufacture of tires it is the practice to assemble all parts of the tire into a complete unit which includes the body with suitable reinforcement, the tread, and the beads with wire reinforcement. This unit is known as a green tire. Green tires are usually produced at one location and the tires are completed at another location by vulcanizing. It is necessary to provide means for storing the green tires after they have been assembled and for transporting them from place to place.

Mobile tire storage racks have been provided in the past; see for example U.S. Pat. No. 3,147,864 issued Sept. 8, 1964 to R. L. Sylvester. These racks take up considerable space during shipment or storage. Thus it is desirable to have a tire storage rack which can be readily disassembled for shipment, storage, or repair. Preferably the tire storage rack has arms with an arcuate upper surface for receiving the tire. It is desirable to include this feature in an arm which has greater structural strength than arms heretofore utilized. It is also desirable to provide uprights with a structure which cooperates with the arms and with the removable mounting feature.

SUMMARY

The present invention relates generally to supports and racks and more particularly to a storage rack for special articles such as tires.

It is an object of the present invention to provide a storage rack which may be readily disassembled for shipment, storage, or repair thereof and which can be reassembled without tools.

Another object is to provide a storage rack in accordance with the foregoing object and which has aligned openings in the bed to receive an upright member, the uppermost opening being elongated to cooperate with means on the upright member and which both vertically and longitudinally positions the upright member relative to the bed.

Still another object of the present invention is to provide a tire storage rack which has generally horizontal arms which are structurally more rigid than prior constructions.

Another object is to provide a tire storage rack in accordance with the foregoing object in which each arm is a tubular member formed from a continuous sheet of material having an arcuate upper portion and a generally flat bottom, and means at the bottom of the tubular member for holding the edges of the sheet in closed position.

A further object of the present invention is to provide a storage rack which includes a tubular arm and a tubular upright of smaller size than the arm and passing therethrough, and having an internal strut in the upright to rigidify the same.

Another object is to provide a storage rack in accordance with the forgoing object in which the internal strut reinforces the upright member in the area of its attachment to the bed.

These, and other objects and advantages of the present invention, will become apparent as the same becomes better understood from the following detailed description when taken in conjunction with the accompanying drawings.

Drawings

FIG. 1 is a front elevational view of a preferred embodiment of the present invention;

FIG. 2 is a horizontal cross-sectional view taken along line 2—2 of FIG. 1;

FIG. 3 is an end view as seen from the right of FIG. 1;

FIGS. 4, 5 and 6 are sectional views taken along lines 4—4, 5—5, and 6—6 of FIG. 3 and on an enlarged scale; and FIGS. 7 and 8 are sectional views taken generally along lines 7—7 and 8—8, respectively, of FIG. 6.

DESCRIPTION:

Reference is now made more particularly to the drawings which illustrate the best presently known mode of carrying out the invention and wherein similar reference characters indicate the same parts throughout the several views.

The embodiment illustrated is in the form of a truck which has a bed, generally designated 10, formed of longitudinally extending members 11-14 and laterally extending members 16-18. These members are advantageously in the form of channels, as best seen in FIG. 7. The bed 10 is supported on wheels 21-24 of which two are conveniently caster-type wheels as best seen in FIGS. 1 and 3.

A plurality of upright support members, generally designated 30, are removably mounted on the bed 10 in a manner hereafter described. A plurality of arms, generally designated 40, are mounted on each support member 30. Each arm extends generally horizontally in a direction laterally of the bed of the truck. While one support member 30 and one arm 40 will be hereafter described, it is to be understood that this description applies to each of the corresponding structures shown in the drawing.

Referring now particularly to FIGS. 4 and 5, it can be seen that each arm 40 is preferably a tubular member which is formed from a continuous sheet of material which has been shaped with an arcuate upper portion 41 and a generally flat bottom 42. The arcuate upper portion 41 is preferably at a radius generally corresponding to the internal radius of a green tire. The sheet has edges 43 and 44 which are disposed adjacent each other at the bottom of the tubular member to provide a closed bottom. A means is provided at the bottom for holding the edges in the closed position, and this means is in the form of a member 46 extending generally the full length of the arm and welded to the bottom 42 at either side of the edges 43 and 44. Alternately, the edges may be welded together. In either event, it is important that the tube be closed at the bottom with the adjacent edges held together to provide a structurally rigid arm. The outer end 47 of the arm is rolled inwardly to rigidify the outer end and to provide a smooth edge which prevents any damage to the green tire. At the inner end of the arm, there are aligned openings for the passage of the upright support member 30. Two internal webs 48, 48' snugly fit at the inside of the tubular member and engage the support member 30. Webs 48 and 48' are welded to the inside of the tube and to the support member to aid in mounting the arms on the support member. The arms are also welded around the periphery of the aforementioned openings. With the aforedescribed construction, the arms 40 are generally rigid structures with no additional rigidifying means intermediate the ends thereof.

The upright support members 30 are preferably cylindrical tubes of a size less than the width of the arms 40 to permit passage therethrough. To give added strength to the uprights 30, there is an internal strut 52, best seen in FIGS. 5 and 6. The strut 52 extends the full length of the support member 30 and is disposed in the direction of the arm; that is, in a direction extending laterally of the truck. In this manner, the strut 52 strengthens the upright 30 in the direction of the moment received from any load on the arms 40.

Adjacent the bottom each support member 30 is a pair of wedges 54, 56 as best seen in FIGS. 6–8. These wedges are preferably permanently secured to the upright members at the longitudinal sides thereof; that is, at a point 90° from the plane of the strut 52. As can be seen, the wedges 54 and 56 are spaced from the bottom of the upright 30 a distance approximating the thickness of the bed 10 of the truck. These wedges aid in removably mounting the upright and arm assembly on the bed of the truck in the manner now to be described.

As best seen in FIGS. 6 and 7, structural members 11 and 12 are preferably spaced apart a distance equal to the diameter of the upright structural member 30. An upper plate 62 spans the flanges of members 11 and 12 and has an opening 63 to receive the upright support member 30. Opening 63 closely receives the support member 30 in the lateral direction, but is elongated in the longitudinal direction. This elongation includes cutout portions 64 and 66 which, at their extremities, have a dimension approximating the average outer dimension of the wedges 54 and 56 on the upright support member 30 (see FIG. 8). The width of the cutouts, as seen in FIG. 6, is slightly greater than the width of the wedges.

A bottom plate 72 spans the lower flanges of the members 11 and 12, as best seen in FIG. 7. Preferably, lower plate 72 has an opening 73 dimensioned to closely receive the lower end of the upright support member 30. Openings 63 and 73 are vertically aligned so that the upright support member 30 is held in an upright position when assembled. In this manner, the upright support member and arm assemblies can be quickly and easily mounted on the bed of the truck in the manner shown in FIGS. 1 and 3 to provide a workable unit. Yet, the tire storage rack may be shipped in a knocked-down condition thereby saving valuable space, and can also be easily disassembled for repair or storage.

Sometimes, because of wear or other reasons, the upright support members 30 may not remain in parallel relationship. A tie bar 74 extends across the upper ends of members 30 and has a plurality of positioning blocks 76 arranged to fit inside the upper ends. Each block 76 may be bifurcated to straddle the internal strut 52, or the strut may be bifurcated to straddle the internal strut 52, or the strut may terminate below the lower end of the block. A fastener in the form of thumb screw 78 is provided on each upright support member 30 at opposite ends of the tie bar 74 to engage its respective block 76. In this manner the tie bar 74 is removably mounted.

It can be seen that the above-described apparatus provides a storage rack which can be easily assembled or disassembled, and which conserves space during shipment or storage. It can also be seen that the apparatus provides an arm of greater structural strength than prior constructions, and a novel upright which cooperates both with the arm and with the removable mounting feature.

While a preferred embodiment of the invention has herein been illustrated and described, this has been done by way of illustration and not limitation, and the invention should not be limited except as required by the scope of the appended claims.

The embodiments of the invention in which an exclusive property or privilege is claimed are defined as follows:

1. A device for storing and handling green tires and the like comprising: a rigid frame defining the bed of the device; a plurality of upright members detachably mounted on the bed of the device in spaced relation in the longitudinal direction thereof; a plurality of elongated generally horizontal arms carried by each upright member; each arm operable to support the green tires and the like and extending in a direction crosswise of the device; means defining a plurality of openings in the bed of the device for slidably receiving the upright members whereby the upright members are detachably mounted on the bed; each opening being sized in the crosswise direction to closely receive and support the upright member and being elongated in the longitudinal direction; wedging means on each upright member at the longitudinal sides thereof for engaging the sides of the elongated opening to vertically position the upright member and hold it in place; and means on the bed of the device below said elongated opening for closely receiving and supporting each upright member in the longitudinal and crosswise directions.

2. The combination of claim 1 wherein each upright member is tubular and includes a strut disposed in the crosswise direction and extending generally the full length of the member to strengthen the same resist the moment from loads on the arms.

3. The combination of claim 2 wherein the arm is a tubular member having an arcuate upper portion and closed at the bottom, and the tubular member having openings for the passage of the upright member therethrough.

4. The combination of claim 1 wherein the frame includes two longitudinally extending frame members spaced from each other in the crosswise direction, and a top plate spanning the frame members at the top and having the elongated opening therein; and wherein the last-mentioned means includes a bottom plate spanning the frame embers at the bottom and having an opening therein complementary to the upright member for closely receiving the upright member.

5. A tire storage rack comprising: a support member; a plurality of elongated generally horizontal arms carried by the support member and each operable to support a tire; each arm being a tubular member formed from a continuous sheet of material shaped with an arcuate upper portion and generally flat at the bottom; the sheet having its edges adjacent each other at the bottom of the tubular member to provide a closed bottom; and fastening means at the bottom of the tubular member for holding the edges in closed position.

6. A tire storage rack as set forth in claim 5 wherein the support member is an upright member, and the tubular member has vertically aligned openings for the passage of the upright member therethrough.

7. A tire storage rack as set forth in claim 6 wherein the support member is tubular and has an internal strut extending the full length thereof and disposed in the direction of the arm.

8. A tire storage rack as set forth in claim 7 wherein the tubular member has an internal web secured to the inner periphery thereof and to the exterior of the support member.

9. A tire storage rack as set forth in claim 8 including a mobile truck having a bed; and means for mounting the support member upon the bed including a top plate on the bed and having an elongate opening therein for passage of the upright member, a bottom plate on the bed and having an opening for closely receiving the upright member, and a pair of wedges on opposite sides of the support member for engaging the sides of the elongate opening to position and hold the support member in place.

10. In a storage rack having an upright member and outwardly extending arms secured to the upright member; the improvement comprising: a bed; cooperating means on the bed and upright member for removably mounting the upright member on the bed; said cooperating means including means at the top of the bed defining an opening for passage of the upright member; the opening closely receiving the upright in a lateral direction and being elongated in a longitudinal direction perpendicular to the lateral direction; wedges secured to the upright member for engaging the elongated sides of the first opening to both vertically and longitudinally position the upright member relative to the bed; and said cooperating means including means on the bed for engaging the upright member at a level below the opening to restrain the upright member from movement in both said lateral and longitudinal directions whereby the upright member is removably mounted on the bed.

11. A storage rack as set forth in claim 10 wherein the arms extend in the lateral direction, and the upright member is tubular; and including an internal strut in the upright member extending crosswise thereof in the lateral direction.

12. A storage rack as set forth in claim 10 wherein the last-mentioned means includes a plate adjacent the bottom of the bed and having an opening shaped for closely receiving the upright member.

* * * * *